United States Patent
Thakur et al.

(10) Patent No.: US 7,134,070 B2
(45) Date of Patent: Nov. 7, 2006

(54) CHECKSUM DETERMINATION

(75) Inventors: Anshuman Thakur, Beaverton, OR (US); Roy Callum, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 396 days.

(21) Appl. No.: 10/658,133

(22) Filed: Sep. 8, 2003

(65) Prior Publication Data
US 2005/0055620 A1     Mar. 10, 2005

(51) Int. Cl.
*G06F 11/00* (2006.01)
(52) U.S. Cl. ......................................... 714/807; 714/701
(58) Field of Classification Search ................ 714/712, 714/758, 707; 709/232
See application file for complete search history.

(56) References Cited

U.S. PATENT DOCUMENTS

| | | | |
|---|---|---|---|
| 5,675,591 A * | 10/1997 | Salzwedel et al. | 714/807 |
| 6,279,140 B1 * | 8/2001 | Slane | 714/807 |
| 6,324,661 B1 * | 11/2001 | Gerbault et al. | 714/718 |
| 6,324,669 B1 * | 11/2001 | Westby | 714/805 |
| 6,412,092 B1 | 6/2002 | Raghunath | |
| 6,728,929 B1 * | 4/2004 | Luong | 714/807 |
| 6,907,466 B1 * | 6/2005 | Alexander et al. | 709/232 |
| 6,944,634 B1 * | 9/2005 | Hertling et al. | 707/200 |
| 6,964,008 B1 * | 11/2005 | Van Meter, III | 714/807 |
| 2001/0036196 A1 | 11/2001 | Blightman et al. | |
| 2003/0088689 A1 | 5/2003 | Alexander, Jr. et al. | |
| 2003/0145101 A1 | 7/2003 | Mitchell et al. | |

* cited by examiner

*Primary Examiner*—Phung My Chung
(74) *Attorney, Agent, or Firm*—Blakely, Sokoloff, Taylor & Zafman LLP

(57) ABSTRACT

One embodiment of a method may include partitioning data into segments of the data, storing in memory a set of checksums of the segments of the data, selecting a portion of the data, and determining a checksum of the portion of the data. The portion of the data may comprise a subset of the segments of the data and/or at least one part of at least one segment of the data. The checksum of the portion of the data may be determined, based, at least in part, upon a checksum of the subset of the segments and/or a checksum of the at least one part of the at least one segment. The checksum of the subset of the segments may be based, at least in part, upon respective checksums, read from the checksums stored in the memory, of segments of the data comprised in the subset of the segments.

26 Claims, 4 Drawing Sheets

CHECKSUM DETERMINATION

FIELD

This disclosure relates to the field of checksum determination.

BACKGROUND

In one conventional communication protocol offload arrangement, one or more operations that typically are executed by a host's general purpose processor to carry out a communication protocol, instead may be executed by protocol offload circuitry in the host. In this conventional arrangement, such operations include fetching data stored in host memory and storing the data in local memory comprised in the offload circuitry. The offload circuitry then determines the size of a communication protocol packet that is intended to comprise a portion of the data, and the portion of the data to be comprised in the packet. Thereafter, the offload circuitry fetches this portion of the data from the local memory and stores it in a temporary buffer. The offload circuitry then generates the packet by appending a protocol header to the portion of the data in the temporary buffer, calculating the checksum of the packet, and inserting the checksum into the header.

Unfortunately, in this conventional arrangement, the fetching of the portion of the data from the local memory and storing thereof in the temporary buffer may involve a significant latency that may significantly increase the time that may be consumed in carrying out these conventional operations. Also unfortunately, in this conventional arrangement, the temporary buffer memory has a size that is sufficient to store the largest communication protocol packet that is expected to be generated by the offload circuitry; this may increase the size and cost of the offload circuitry.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
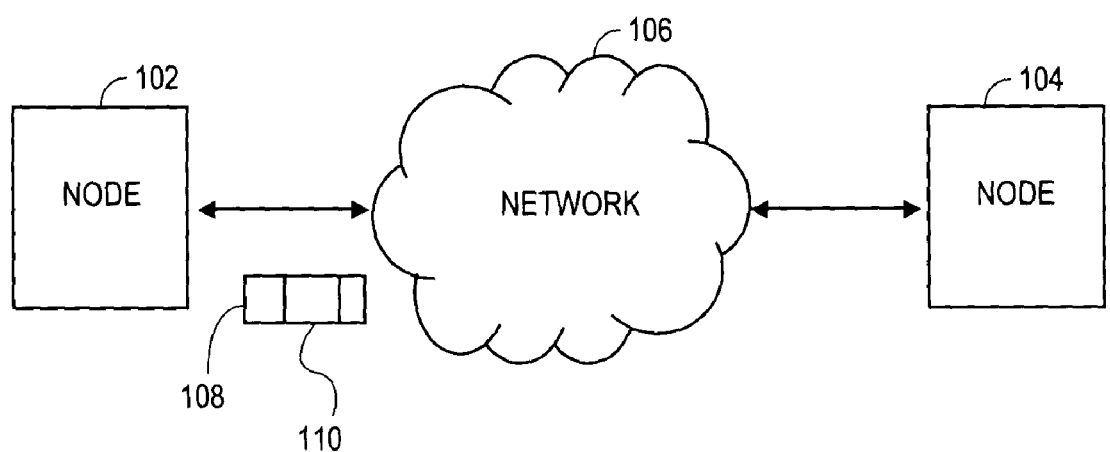
FIG. 1 illustrates a network embodiment.

FIG. 1 illustrates a network embodiment 100. Embodiment 100 includes a plurality of nodes 102 and 104 that are communicatively coupled together via network 106. Network 106 may comprise, for example, one or more local and/or wide area networks (not shown). Each of these one or more local and/or wide area networks may comprise one or more respective end and/or intermediate nodes (not shown) that may be communicatively coupled together. In this embodiment, nodes 102 and 104 each may transmit and/or receive one or more frames via network 106. Each of these frames may comprise one or more packets. Each of these frames and packets may be in accordance with one or more communication protocols. For example, in this embodiment, node 102 may generate and transmit to node 104, via network 106, frame 108 which may encapsulate packet 110. Also for example, in this embodiment, frame 108 may be compatible and/or in compliance with an Ethernet communication protocol, and packet 110 may be compatible and/or in compliance with a transmission control protocol (TCP) and/or internet protocol (IP).

As used herein, a "frame" means a sequence of one or more symbols and/or values that may be encoded by one or more signals transmitted from at least one sender to at least one receiver. As used herein, a "packet" also means a sequence of one or more symbols and/or values that may be encoded by one or more signals transmitted from at least one sender to at least one receiver. Additionally, as used herein, a "communication protocol" means a set of one or more rules defining, at least in part, a manner in which data and/or one or more commands may be transmitted.

In this embodiment, as generated and transmitted from node 102, frame 108 may be compatible and/or in compliance with an Ethernet communication protocol described in, for example, Institute of Electrical and Electronics Engineers, Inc. (IEEE) Std. 802.3, 2000 Edition, published on Oct. 20, 2000. Also, in this embodiment, as generated and encapsulated in frame 108 by node 102, packet 110 may be compatible and/or in compliance with a TCP and/or IP described in, for example, Internet Engineering Task Force (IETF) Request For Comments (RFC) 791 and 793, respectively, published September 1981. Of course, alternatively or additionally, frame 108 and/or packet 110 may be compatible and/or in compliance with one or more other and/or additional communication protocols, without departing from this embodiment.

In network 100, each of the nodes 102 and 104 may be substantially identical (e.g., in terms of construction and/or operation) to each other. Alternatively, without departing from this embodiment, node 102 and node 104 may not be substantially identical to each other (e.g., in terms of construction and/or operation).

In this embodiment, node 102 and/or node 104 each may comprise a respective host node and/or end node. However, alternatively, although not shown in FIG. 1, one or more the nodes 102 and 104 may comprise a respective intermediate station, such as, for example, a respective hub, switch, and/or router. Of course, many alternatives are possible without departing from this embodiment.

Figure 2:
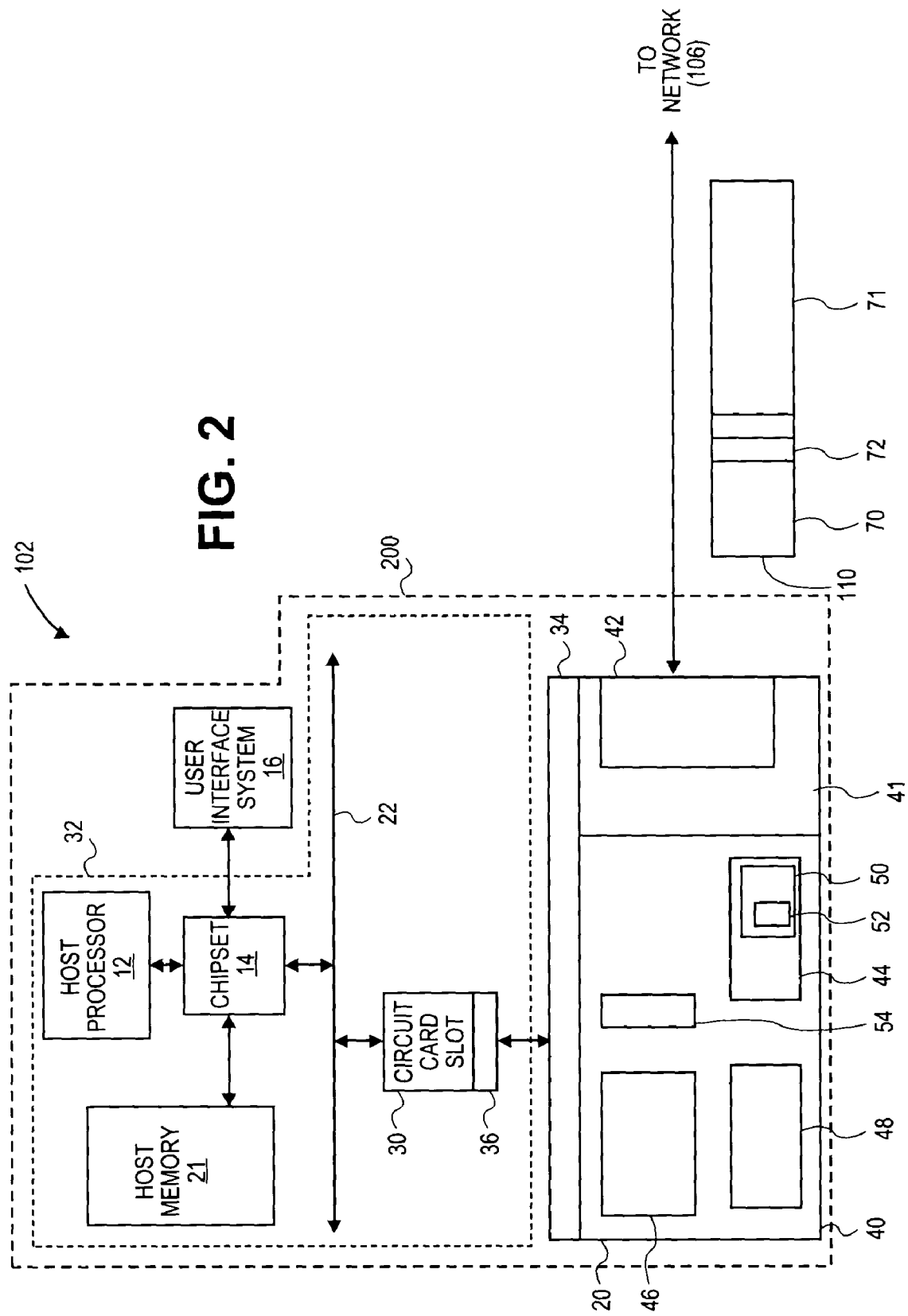
FIG. 2 illustrates a system embodiment.

FIG. 2 illustrates a system embodiment comprised in, for example, node 102. In this embodiment, node 102 may comprise operative circuitry 200. Operative circuitry 200 may include, for example, a host processor 12 coupled to a chipset 14. Host processor 12 may comprise, for example, an Intel® Pentium® IV microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system that may couple host processor 12, a host memory 21 and a user interface system 16 to each other and to a bus system 22. Chipset 14 may also include an I/O bridge/hub system (not shown) that may couple the host bridge/bus system to bus 22. Chipset 14 may comprise one or more integrated circuit chips, such as those selected from integrated circuit chipsets commercially available from the Assignee of the subject application (e.g., graphics memory and I/O controller hub chipsets), although other integrated circuit chips may also, or alternatively be used. User interface system 16 may comprise, e.g., a keyboard, pointing device, and display system that may permit a human user (not shown) to input data and/or one or more commands to, and to monitor, at least in part, the operation of, circuitry 200.

Bus 22 may comprise a bus that complies with the Peripheral Component Interconnect (PCI) Local Bus Specification, Revision 2.2, Dec. 18, 1998, available from the PCI Special Interest Group, Portland, Oreg., U.S.A. (hereinafter referred to as a "PCI bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 22 may comprise other types and configurations of bus systems.

Processor 12, host memory 21, chipset 14, PCI bus 22, and circuit card slot 30 may be comprised in a single circuit board, such as, for example, a system motherboard 32. Circuit card slot 30 may comprise a PCI expansion slot that comprises a PCI bus connector 36. Connector 36 may be electrically and mechanically mated with a PCI bus connector 34 that is comprised in communication protocol offload circuit card 20. Slot 30 and card 20 may be constructed to permit card 20 to be inserted into slot 30. When card 20 is properly inserted into slot 30, connectors 34 and 36 may become electrically and mechanically coupled to each other. When connectors 34 and 36 are so coupled to each other, operative communication protocol offload circuitry 40 in card 20 becomes electrically coupled to bus 22.

When circuitry 40 is electrically coupled to bus 22, host processor 12 may exchange data and/or one or more commands with circuitry 40, via chipset 14 and bus 22, that may permit host processor 12 to control and/or monitor, at least in part, the operation of circuitry 40. In this embodiment, circuitry 40 may include, for example, network interface circuitry 41, and computer-readable memories 44, 46, 48, and 54. Network interface circuitry 41 may comprise transceiver circuitry 42.

Memories 21, 44, 46, 48, and 54 each may comprise read only, mass storage, and/or random access computer-readable memory. Memory and/or memory 54 may store program instructions capable of being executed, and/or data capable of being accessed, operated upon, and/or manipulated by processor 12 and/or circuitry 40. The execution of these program instructions and/or the accessing, operation upon, and/or manipulation of this data by processor 12 and/or circuitry 40 may result in, for example, processor 12, circuitry 40, circuitry 200, and/or node 102 carrying out the operations described herein as being carried out by processor 12, circuitry 40, circuitry 200, and/or node 102.

Without departing from this embodiment, instead of being comprised in card 20, all or a portion of operative circuitry 40 may be comprised in other structures, systems, and/or devices that may be, for example, comprised in motherboard 32, coupled to bus 22, and exchange data and/or commands with other components in operative circuitry 200. For example, without departing from this embodiment, chipset 14 may comprise one or more integrated circuits that may comprise all or a portion of operative circuitry 40. Other modifications are also possible, without departing from this embodiment. In this embodiment, transceiver circuitry 42 may be capable of being communicatively coupled to network 106. As is discussed in below, circuitry 42 may be capable of transmitting frame 108 from node 102 to network 106. Network 106 may transmit frame 108 to node 104.

In this embodiment, packet 110 may comprise a TCP header 70. Header 70 may comprise a TCP packet checksum 72. In this embodiment, circuitry 40 may generate header 70, including checksum 72.

These and other operations 400 that may be carried out in network 100, in accordance with an embodiment, will now be described with reference being made to FIGS. 1 to 4. After, for example, a reset of card 20 and/or circuitry 200, processor 12 may signal memory 21. This may result in a contiguous block of data comprising data 300, shown in FIG. 3, being stored in memory 21. Data 300 may have a size that is equal to M bytes, where M may be a positive integer. The size of data 300 may vary without departing from this embodiment.

Thereafter, circuitry 40 and/or host processor 12 may signal memory 21. This may result in data 300 being read by circuitry 40 and/or host processor 12 and partitioned into a plurality of contiguous segments 302A, 302B, 302C, 302D, 302E, 302F 302G, 302H . . . 302Z of data 300, as illustrated by operation 402 in FIG. 4. In this embodiment, depending upon the size of data 300, each of the segments 302A, 302B, 302C, 302D, 302E, 302F 302G, 302H . . . 302Z may have an identical respective size that may be equal to N bytes, where N may be equal to, for example, 256. The number and respective sizes of the segments 302A, 302B, 302C, 302D, 302E, 302F 302G, 302H . . . 302Z may vary without departing from this embodiment. Additionally or alternatively, the respective sizes of the segments 302A, 302B, 302C, 302D, 302E, 302F 302G, 302H . . . 302Z may not be identical without departing from this embodiment.

Contemporaneously with, after, or before, at least in part, execution of operation 402, processor 12 and/or circuitry 40 may signal memory 21. As is illustrated by operation 404, this may result in segments 302A, 302B, 302C, 302D, 302E, 302F 302G, 302H . . . 302Z being read and/or retrieved, at least in part, by circuitry 40 from memory 21, and/or stored, at least in part, in local memory 44, contemporaneously with, after, or before, at least in part, the execution of operation 402. Contemporaneous with, after, or before the execution of operation 404, circuitry 40 may examine each of the segments 302A, 302B, 302C, 302D, 302E, 302F 302G, 302H . . . 302Z, and based, at least in part upon the respective data comprised in each of the segments 302A, 302B, 302C, 302D, 302E, 302F 302G, 302H . . . 302Z, circuitry 40 may generate and store in memory 44 a set of checksums 52 of the segments 302A, 302B, 302C, 302D, 302E, 302F 302G, 302H . . . 302Z, as illustrated by operation 406 in FIG. 4. In this embodiment, the set of checksums 52 may be stored in memory 44 in a data structure, such as, table 50. Table 50 may correlate and/or associate checksums in set 52 with respective segments 302A, 302B, 302C, 302D, 302E, 302F 302G, 302H . . . 302Z based upon which, at least in part, the checksums were generated by circuitry 40. In this embodiment, the checksums in set 52 may be respective 16-bit checksum words generated in compliance with conventional TCP checksum generation techniques, based at least in part upon the respective data comprised in segments 302A, 302B, 302C, 302D, 302E, 302F 302G, 302H . . . 302Z. This embodiment is not limited to such techniques, and other checksum generation techniques may be employed without departing from this embodiment. Additionally, the checksums in set 52 may comprise other and/or additional word sizes without departing from this embodiment.

In this embodiment, conventional TCP checksum generation techniques may be used to generate the checksums in set 52. As is known to those skilled in the art, such techniques use, as input operands, and generate, as output, 16-bit words. In this embodiment, the set of checksums 52 generated as a result of operation 406 may comprise two subsets of checksums. One such subset may comprise respective checksums of each of the segments 302A, 302B, 302C, 302D, 302E, 302F 302G, 302H . . . 302Z. The other such subset may comprise respective checksums of respective segments (not shown) of data 300 each having identical respective size N, but having respective boundaries that are each shifted, relative to the respective boundaries of segments 302A, 302B, 302C, 302D, 302E, 302F, 302G, 302H . . . 302Z, by one respective byte in the direction toward the tail end of the data block that comprises data 300. After the shifting, the start and end of each of the shifted segments of data 300 may be padded with a respective byte of zeroes to make each such shifted segment 16-bit aligned to permit it to be able to serve as an input for checksum calculation. Accordingly, in this arrangement, data 300 may comprise the respective data comprised in each of these segments, and the set of checksums 52 may comprise a number of checksums that is equal to twice the quotient of M divided by N. Of course, the number of checksums comprised in set 52 may vary without departing from this embodiment. In this arrangement, circuitry 40 may select one or more appropriate checksums from set 52 for use in accordance with this embodiment as described below, based at least in part upon, for example, the actual boundaries of segment(s) of data 300 that may be comprised in packet 110. For example, if portion 71 of data 300 (or a previous, not shown portion of data 300 that may have been previously transmitted from node 102 in another not shown packet) comprises an odd number of bytes, circuitry 40 may select, for use in accordance with this embodiment as described below, one or more appropriate checksums from set 52 that may correspond to one or more appropriately shifted versions of one or more of the segments 302A, 302B, 302C, 302D, 302E, 302F, 302G, 302H . . . 302Z.

Figure 4:
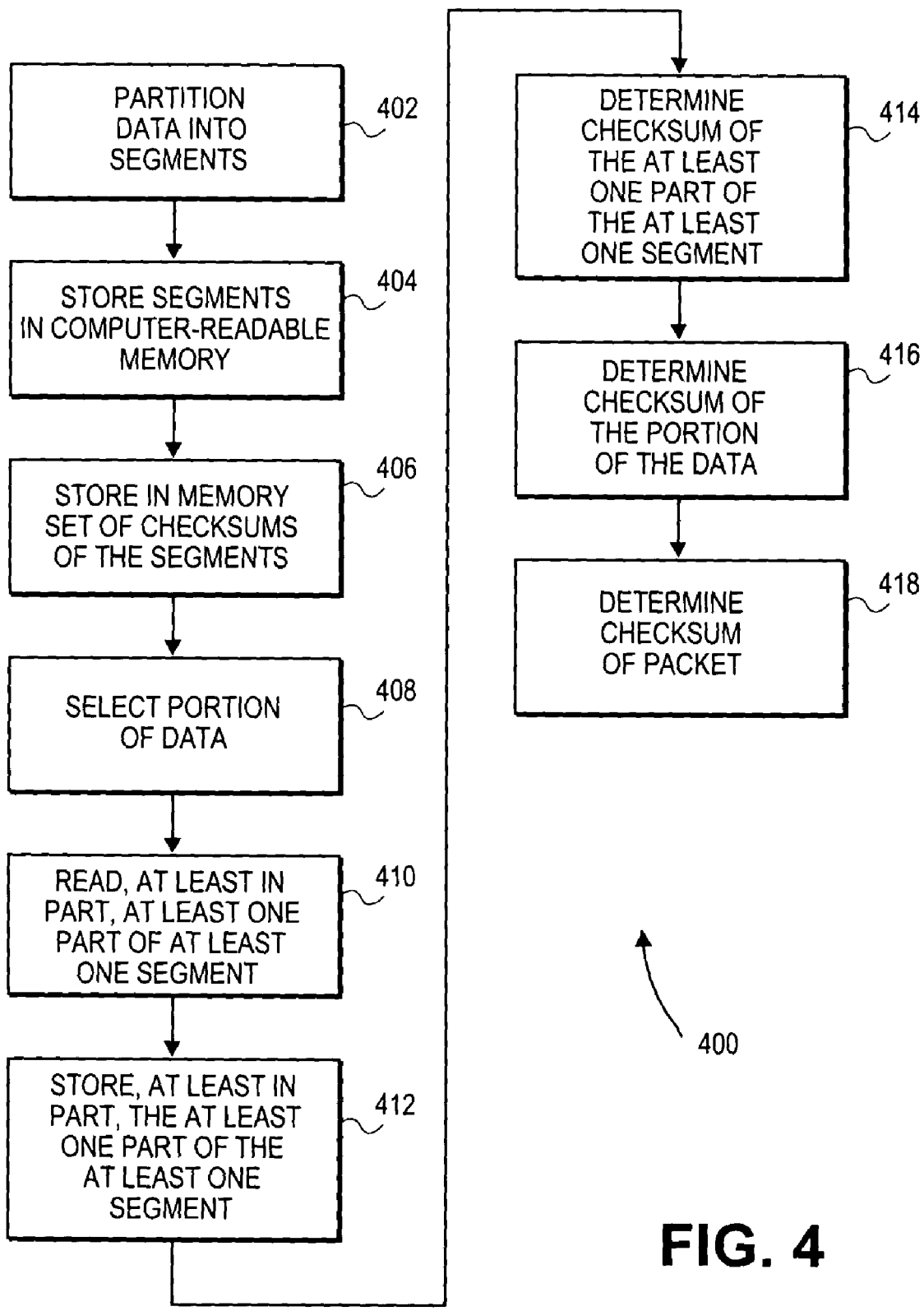
FIG. 4 is a flowchart illustrating operations that may be performed according to an embodiment.

In this embodiment, contemporaneously with, after, or before execution of operation 406, circuitry 40 may select a portion of the data 300 to be included in packet 110 to be transmitted to node 104, as illustrated by operation 408 in FIG. 4. As used herein, a "portion" of data means some or all of the data. As a result of operation 408, circuitry 40 may select portion 71 of data 300 to be included in packet 110. In this embodiment, circuitry 40 may select portion 71 of data 300 to be included in packet 110 based, at least in part, upon a maximum size of packet 110 and/or frame 108 permitted pursuant to one or more communication protocols, such as, for example, TCP, IP, and/or Ethernet communication protocols, and/or one or more flow control parameters. For example, in this embodiment, these one or more communication protocols may specify a maximum size that packet 110 and/or frame 108 be permitted to have, as well as, maximum respective sizes of header 70 and/or the data payload in packet 110 and/or frame 108. As part of operation 408, in this embodiment, circuitry 40 may select portion 71 such that the amount of data 300 comprised in portion 71 may permit the resulting packet 110 and/or frame 108 to have a respective size that is compliant and/or compatible with these one or more communication protocols.

In this embodiment, these one or more flow control parameters may indicate and/or specify, at least in part, and/or may be based at least in part upon, status of a connection and/or session, such as a TCP connection or TCP session, between nodes 102 and 104. For example, these one or more flow control parameters may indicate and/or specify, at least in part, a level of congestion in network 106, a maximum packet size that node 104 may be capable of receiving from node 102, and/or a maximum data transfer amount (e.g., a maximum amount of data that may be transferred to and received by node 104). These one or more flow control parameters may comprise one or more TCP flow control parameters. As part of operation 408, in this embodiment, circuitry 40 may select portion 71 such that the amount of data 300 comprised in portion 71 may permit the resulting packet 110 and/or frame 108 to have a respective size that satisfies and/or is in accordance with these one or more flow control parameters.

Figure 3:
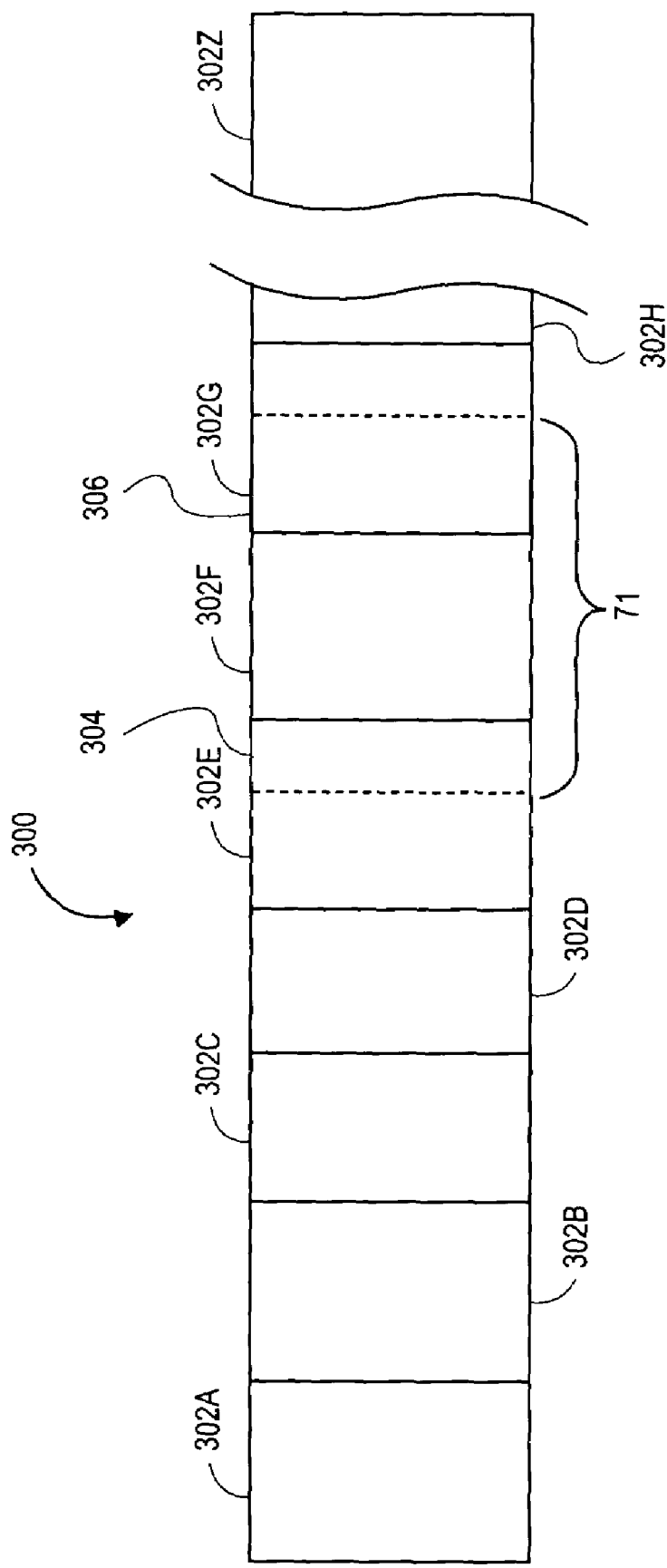
FIG. 3 illustrates data partitioned into segments according to an embodiment.

In this embodiment, portion 71 of data 300 selected by circuitry 40 as a result of operation 408 may comprise a subset of the segments 302A, 302B, 302C, 302D, 302E, 302F 302G, 302H . . . 302Z and/or at least one part of at least one of the segments 302A, 302B, 302C, 302D, 302E, 302F 302G, 302H . . . 302Z. For example, as shown in FIG. 3, for purposes of illustration and not limitation, portion 71 of data 300 may comprise segment 302F, part 304 of segment 302E, and part 306 of segment 302G.

In this embodiment, after execution of operation 408, circuitry 40 may read, at least in part, from memory 44 the at least one part of the at least one of segments 302A, 302B, 302C, 302D, 302E, 302F 302G, 302H . . . 302Z comprised in portion 71 of data 300, as illustrated by operation 410 in FIG. 4. Also after execution of operation 408, as illustrated by operation 412 in FIG. 4, in this embodiment, circuitry 40 may store, at least in part, in memory 46 and/or memory 48, this at least one part of this at least one of the segments 302A, 302B, 302C, 302D, 302E, 302F 302G, 302H . . . 302Z. For example, in this embodiment, as a result of operation 410, circuitry 40 may read, at least in part, part 304 of segment 302E and/or part 306 of segment 302G from memory 44. Also for example, in this embodiment, as a result of operation 412, circuitry 40 may store, at least in part, part 304 of segment 302E in memory 46 and/or circuitry 40 may store, at least in part, part 306 of segment 302G in memory 48. In this embodiment, memories 46 and 48 may comprise respective buffer memories. In this embodiment, memory 46 and memory 48 may each have a respective storage capacity equal to the size of one of the segments 302A, 302B, 302C, 302D, 302E, 302F 302G, 302H . . . 302Z, such as, for example, N bytes.

In this embodiment, contemporaneously with, at least in part, the carrying out of operation 410 and/or operation 412, circuitry 40 may determine the checksum of the at least one part of the at least one of the segments 302A, 302B, 302C, 302D, 302E, 302F 302G, 302H . . . 302Z comprised in portion 71 of data 300, as illustrated by operation 414 in FIG. 4. For example, as part of operation 414, circuitry 40 may use conventional TCP checksum techniques to calculate respective checksums for part 304 of segment 302E and part 306 of segment 302G. Alternatively, if portion 71 of data 300 does not comprise part 304 of segment 302E and/or part 306 of segment 302G, operation 410, operation 412, and/or operation 414 may not be executed. Further alternatively, if the other part of segment 302E (i.e., all of segment 302E except for part 304) was previously transmitted from node 102 in another packet (not shown), circuitry 40 may have previously calculated the checksum of this other part of segment 302E; in this alternative arrangement, as part of operation 414, circuitry 40 may calculate, at least in part, the checksum of part 304 based upon, at least in part, this previously calculated checksum of this other part of segment 302E, the appropriate checksum of 302E in table 50, and conventional checksum calculation techniques.

Circuitry 40 may generate a temporary version of header 70 of packet 110. This temporary version of header 70 may be identical to the actual header 70 of packet 110, except that in the temporary version of header 70, the checksum 72 may be set equal to zero. If part 304 of segment 302E is comprised in portion 71, after completion of operation 412, circuitry 40 may signal memory 46. This may result in the temporary version of header 70 being concatenated with part 304 of segment 302E, and the resulting concatenation being stored in memory 46. Circuitry 40 also may calculate, using conventional TCP checksum calculation techniques, the checksum of this temporary version of header 70.

After, prior to, or contemporaneously with the execution of operation 414, circuitry 40 may determine the checksum of the subset of the segments 302A, 302B, 302C, 302D, 302E, 302F 302G, 302H . . . 302Z comprised in portion 71 of data 300, based at least in part upon the respective checksums, read from the set of checksums 52, of the segment or segments comprised in this subset of the segments. For example, in this embodiment, circuitry 40 may determine which of the segments 302A, 302B, 302C, 302D, 302E, 302F 302G, 302H . . . 302Z may be comprised in the subset of segments 302A, 302B, 302C, 302D, 302E, 302F 302G, 302H . . . 302Z that is comprised in portion 71 of data 300. Thereafter, based at least in part upon the contents of table 50 (e.g., read by circuitry 40 from the set of checksums 52), circuitry 40 may add together the appropriate respective checksums of the segments comprised in this subset of segments 302A, 302B, 302C, 302D, 302E, 302F 302G, 302H . . . 302Z to generate a sum that may correspond to the checksum of the subset of segments 302A, 302B, 302C, 302D, 302E, 302F 302G, 302H . . . 302Z comprised in portion 71 of data 300. For example, in this embodiment, since the subset of segments 302A, 302B, 302C, 302D, 302E, 302F 302G, 302H . . . 302Z comprised in portion 71 of data 300 comprises only segment 302F, the circuitry 40 determine that the checksum of this subset of segments is equal to the respective checksum of segment 302F that is appropriate given the actual boundaries of segment 302F as comprised in portion 71 of data 300. Alternatively, if no subset of segments 302A, 302B, 302C, 302D, 302E, 302F 302G, 302H . . . 302Z is comprised in portion 71 of data 300, then the determination of the checksum of such subset may not occur.

Thereafter, circuitry 40 may determine, based at least in part upon the checksum of the subset of the segments 302A, 302B, 302C, 302D, 302E, 302F 302G, 302H . . . 302Z comprised in portion 71 of data 300 and/or the checksum of the at least one part of at least one segment of data 300, the checksum of portion 71 of data 300, as illustrated by operation 416 in FIG. 4. In this embodiment, circuitry 40 may accomplish this by adding together the respective checksums of part 304 of segment 302E, part 306 of segment 302G, and the subset of the segments 302A, 302B, 302C, 302D, 302E, 302F 302G, 302H . . . 302Z comprised in portion 71 of data 300. Thus, in this embodiment, since this subset of segments 302A, 302B, 302C, 302D, 302E, 302F 302G, 302H . . . 302Z comprises only segment 302F, the checksum of portion 71, as determined by circuitry 40 as a result of operation 416 may be equal to the sum of the respective checksums of part 304 of segment 302E, part 306 of segment 302G, and segment 302F. Alternatively, if part 304 of segment 302E and/or part 306 of segment 302G are not comprised in portion 71, the checksum of portion 71 of data 300, determined as a result of operation 416, may not be determined based, at least in part, upon their respective checksums. Similarly, if no subset of the segments 302A, 302B, 302C, 302D, 302E, 302F 302G, 302H . . . 302Z is comprised in portion 71, then the checksum of portion 71 of data 300, determined as a result of operation 416, may not be based, at least in part, upon its checksum. Alternatively or additionally, circuitry 40 also may calculate the checksum of the remaining part of segment 302G (i.e., all of segment 302G except for part 306); that is, circuitry 40 may calculate, at least in part, the checksum of this remaining part of segment 302G based upon, at least in part, the checksum of part 306 of segment 302G, the appropriate checksum of 302G in table 50, and conventional checksum calculation techniques. This checksum of the remaining part of segment 302G may be used by circuitry 40 to calculate the checksum of another packet that may be comprise this remaining part of segment 302G and may be transmitted from node 102 after packet 110 has been transmitted from node 102.

After determining the checksum of portion 71 of data 300, circuitry 40 may determine the checksum of packet 110, based at least in part upon the checksum of the portion 71 of data 300, as illustrated by operation 418 in FIG. 4. For example, in this embodiment, circuitry 40 may determine the checksum of packet 110 by adding together the checksum of portion 71 of data 300, determined as a result of operation 416, and the checksum of the temporary version of header 70, with the resulting sum being considered as the checksum of packet 110. Thereafter, circuitry 40 may overwrite the checksum in the temporary version of header 70 with the checksum of packet 110 determined as result of operation 418. Circuitry 40 may then read the concatenation of header 70 and part 304 of segment 302E from memory 46, the subset of the segments 302A, 302B, 302C, 302D, 302E, 302F 302G, 302H . . . 302Z comprised in portion 71 of data 300 from memory 44, and part 306 of segment 302G from memory 48, and may transmit them to interface circuitry 42, which may then transmit them to node 104 via network 106, in the appropriate sequence order to constitute packet 110, encapsulated in frame 108.

Thus, one system embodiment may comprise a circuit board that includes a circuit card slot, and a circuit card that is capable of being coupled to the circuit board via the circuit card slot. The circuit card may include circuitry that may be capable of partitioning data into segments of the data, storing in memory a set of checksums of the segments of the data, selecting a portion of the data, and determining a checksum of the portion of the data. The portion of the data may comprise at least one of a subset of the segments of the data and at least one part of at least one of the segments of the data. The checksum of the portion of the data may be determined, based, at least in part, upon at least one of a checksum of the subset of the segments of the data and a checksum of the at least one part of the at least one of the segments of the data. The checksum of the subset of the segments of the data may be based, at least in part, upon respective checksums, read from the set of checksums stored in the memory, of segments of the data comprised in the subset of the segments of the data.

These features of this system embodiment may obviate having to fetch this portion of the data from circuit card local memory and store this portion of the data in circuit card buffer memory. Additionally, these features of this system embodiment may obviate having to store an entire packet in such buffer memory; this may permit the size of such memory to be substantially reduced compared to the prior art. Thus, advantageously, these features of this system embodiment may permit offload operations performed by this embodiment to exhibit reduced latency compared to the prior art. Also advantageously, these features of this system embodiment may permit this system embodiment to be less expensive than the prior art.

The terms and expressions which have been employed herein are used as terms of description and not of limitation, and there is no intention, in the use of such terms and expressions, of excluding any equivalents of the features shown and described (or portions thereof), and it is recognized that various modifications, variations, alternatives, and equivalents are possible within the scope of the claims. For example, the signaling of a first device by second device may, but is not required to comprise, the second device providing one or more signals to a third device that may result in the third device providing one or more signals to the first device that may result in the first device performing one or more operations. Other modifications are also possible. Accordingly, the claims are intended to cover all such modifications, variations, alternatives, and equivalents.

What is claimed is:

1. A method comprising:
   partitioning data into segments of the data;
   storing in memory a set of checksums of the segments of the data, the set of checksums having a first subset corresponding to the segments of data and a second subset corresponding to the segments of data shifted by a predetermined amount;
   selecting a portion of the data comprising at least one of a subset of the segments of the data and at least one part of at least one segment of the data; and determining a checksum of the portion of the data based upon at least one of a checksum of the subset of the segments of the data and a checksum of the at least one part of the at least one segment of the data, the checksum of the subset of the segments of the data being based, at least in part, upon respective checksums, read from the set of checksums stored in the memory, of segments of the data comprised in the subset of the segments of the data.

2. The method of claim 1, further comprises:
   determining, based at least in part upon the checksum of the portion of the data, a checksum of the packet
   the selecting of the portion of the data is based, at least in part, upon a size of a packet; and
   the packet comprises the portion of the data and the checksum of the packet.

3. The method of claim 2, wherein:
   the size of the packet is selected based, at least in part, upon one or more flow control parameters.

4. The method of claim 3, wherein:
   the one or more flow control parameters are based, at least in part, upon one or more of the following: a level of network congestion, a maximum packet size, and a maximum data transfer amount.

5. The method of claim 4, wherein:
   the checksum of the packet comprises a transmission control protocol (TCP) segment checksum; and the one or more flow control parameters indicate, at least in part, status of a TCP connection.

6. The method of claim 1, wherein:
   each of the segments of the data has an identical respective size equal to N bytes;
   the data has a size equal to M bytes; and
   the set of checksums includes a number of checksums equal to twice the quotient of M divided by N.

7. The method of claim 1, the method further comprising:
   storing the segments of the data in computer-readable memory;
   determining the checksum of the at least one part of the at least one segment of the data; and
   contemporaneously, at least in part, with the determining of the checksum of the at least one part of the at least one segment of the data, at least one of:
   reading, at least in part, the at least one part of the at least one segment of the data from the computer-readable memory; and
   storing, at least in part, the at least one part of the at least one segment of the data in another computer-readable memory.

8. An apparatus comprising:
   circuitry that is capable of:
   partitioning data into segments of the data;
   storing in memory a set of checksums of the segments of the data, the set of checksums having a first subset corresponding to the segments of data and a second subset corresponding to the segments of data shifted by a predetermined amount;
   selecting a portion of the data comprising at least one of a subset of the segments of the data and at least one part of at least one segment of the data; and
   determining a checksum of the portion of the data based upon at least one of a checksum of the subset of the segments of the data and a checksum of the at least one part of the at least one segment of the data, the checksum of the subset of the segments of the data being based, at least in part, upon
   respective checksums, read from the set of checksums stored in the memory,
   of segments of the data comprised in the subset of the segments of the data.

9. The apparatus of claim 8, wherein
   the circuitry is also capable of determining, based at least in part upon the checksum of the portion of the data, a checksum of the packet;
   the circuitry is also capable of selecting of the portion of the data based, at least in part, upon a size of a packet; and
   the packet comprises the portion of the data and the checksum of the packet.

10. The apparatus of claim 9, wherein:
    the circuitry is also capable of selecting the size of the packet based, at least in part, upon one or more flow control parameters.

11. The apparatus of claim 10, wherein: the one or more flow control parameters are based, at least in part, upon one or more of the following: a level of network congestion, a maximum packet size, and a maximum data transfer amount.

12. The apparatus of claim 11, wherein
    the checksum of the packet comprises a transmission control protocol (TCP) segment checksum; and
    the one or more flow control parameters indicate, at least in part, status of a TCP connection.

13. The apparatus of claim 8, wherein:
    each of the segments of the data has an identical respective size equal to N bytes; the data has a size equal to M bytes; and
    the set of checksums includes a number of checksums equal to twice the quotient of M divided by N.

14. The apparatus of claim 8, wherein
the circuitry is also capable of storing the segments of the data in computer-readable memory, determining the checksum of the at least one part of the at least one segment of the data, and contemporaneously, at least in part, with the determining of the checksum of the at least one part of the at least one segment of the data, at least one of
reading, at least in part, the at least one part of the at least one segment of the data from the computer-readable memory; and
storing, at least in part, the at least one part of the at least one segment of the data in another computer-readable memory.

15. An article comprising
a storage medium that stores instructions that when executed by a machine result in the following:
partitioning data into segments of the data;
storing in memory a set of checksums of the segments of the data, the set of checksums having a first subset corresponding to the segments of data and a second subset corresponding to the segments of data shifted by a predetermined amount;
selecting a portion of the data comprising at least one of a subset of the segments of the data and at least one part of at least one segment of the data; and
determining a checksum of the portion of the data based upon at least one of a checksum of the subset of the segments of the data and a checksum of the at least one part of the at least one segment of the data, the checksum of the subset of the segments of the data being based, at least in part, upon respective checksums, read from the set of checksums stored in the memory, of segments of the data comprised in the subset of the segments of the data.

16. The article of claim 15, wherein:
the instructions when executed by the machine also result in determining, based at least in part upon the checksum of the portion of the data, a checksum of the packet; and
the selecting of the portion of the data is based, at least in part, upon a size of a packet; and
the packet comprises the portion of the data and the checksum of the packet.

17. The article of claim 16, wherein:
the size of the packet is selected based, at least in part, upon one or more flow control parameters.

18. The article of claim 17, wherein:
the one or more flow control parameters are based, at least in part, upon one or more of the following: a level of network congestion, a maximum packet size, and a maximum data transfer amount.

19. The article of claim 18, wherein:
the checksum of the packet comprises a transmission control protocol (TCP) segment checksum; and
the one or more flow control parameters indicate, at least in part, status of a TCP connection.

20. The article of claim 15, wherein:
each of the segments of the data has an identical respective size equal to N bytes; the data has a size equal to M bytes; and the set of checksums includes a number of checksums equal to twice the quotient of M divided by N.

21. The article of claim 15, wherein the instructions when executed by the machine also result in:
storing the segments of the data in computer-readable memory; determining the checksum of the at least one part of the at least one segment of the data; and
contemporaneously, at least in part, with the determining of the checksum of the at least one part of the at least one segment of the data, at least one of:
reading, at least in part, the at least one part of the at least one segment of the data from the computer-readable memory; and
storing, at least in part, the at least one part of the at least one segment of the data in another computer-readable memory.

22. A system comprising:
a circuit board that includes a circuit card slot; and
a circuit card that is capable of being coupled to the circuit board via the circuit card slot, the circuit card including circuitry that is capable of:
storing in memory a set of checksums of the segments of the data, the set of checksums having a first subset corresponding to the segments of data and a second subset corresponding to the segments of data shifted by a predetermined amount;
selecting a portion of the data comprising at least one of a subset of the segments of the data and at least one part of at least one segment of the data; and
determining a checksum of the portion of the data based upon at least one of a checksum of the subset of the segments of the data and a checksum of the at least one part of the at least one segment of the data, the checksum of the subset of the segments of the data being based, at least in part, upon respective checksums, read from the set of checksums stored in the memory, of segments of the data comprised in the subset of the segments of the data.

23. The system of claim 22, wherein:
the circuit board includes a host processor and a bus that couples the host processor to the circuit card slot; and
when the circuit card is coupled to the circuit board via the circuit card slot, the circuit card is coupled to the host processor via the bus.

24. The system of claim 23, wherein:
the circuit card includes computer-readable memory to store the data and at least one buffer memory to store the at least one part of the at least one of the segments of the data.

25. The system of claim 23, wherein:
the circuit board includes host memory that is capable of storing the data;
the circuit card includes computer-readable memory; and
when the circuit card is coupled to the circuit board via the circuit card slot, the circuitry is capable of receiving the data from the host memory and storing the data in the computer-readable memory.

26. The system of claim 25, wherein:
the circuitry is also capable of generating a transmission control protocol (TCP) packet that comprises the portion of the data and the checksum of the portion of the data.

* * * * *